Oct. 22, 1957　　　　　E. C. MILLER　　　　2,810,835
COMPOSITION ANALYZER UTILIZING RADIATION
Filed Oct. 5, 1953　　　　　　　　　　2 Sheets-Sheet 1
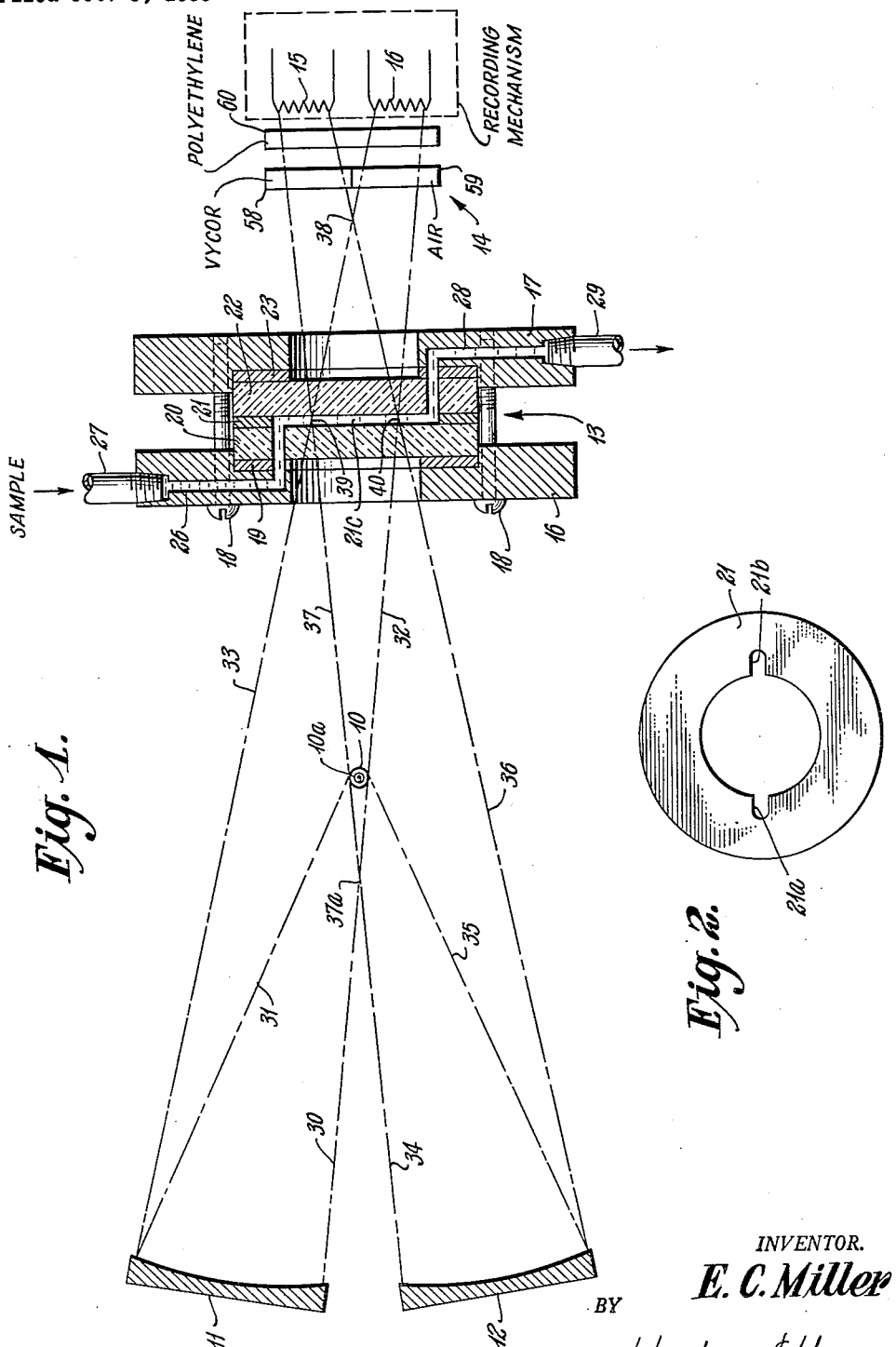
INVENTOR.
*E. C. Miller*
BY
ATTORNEYS

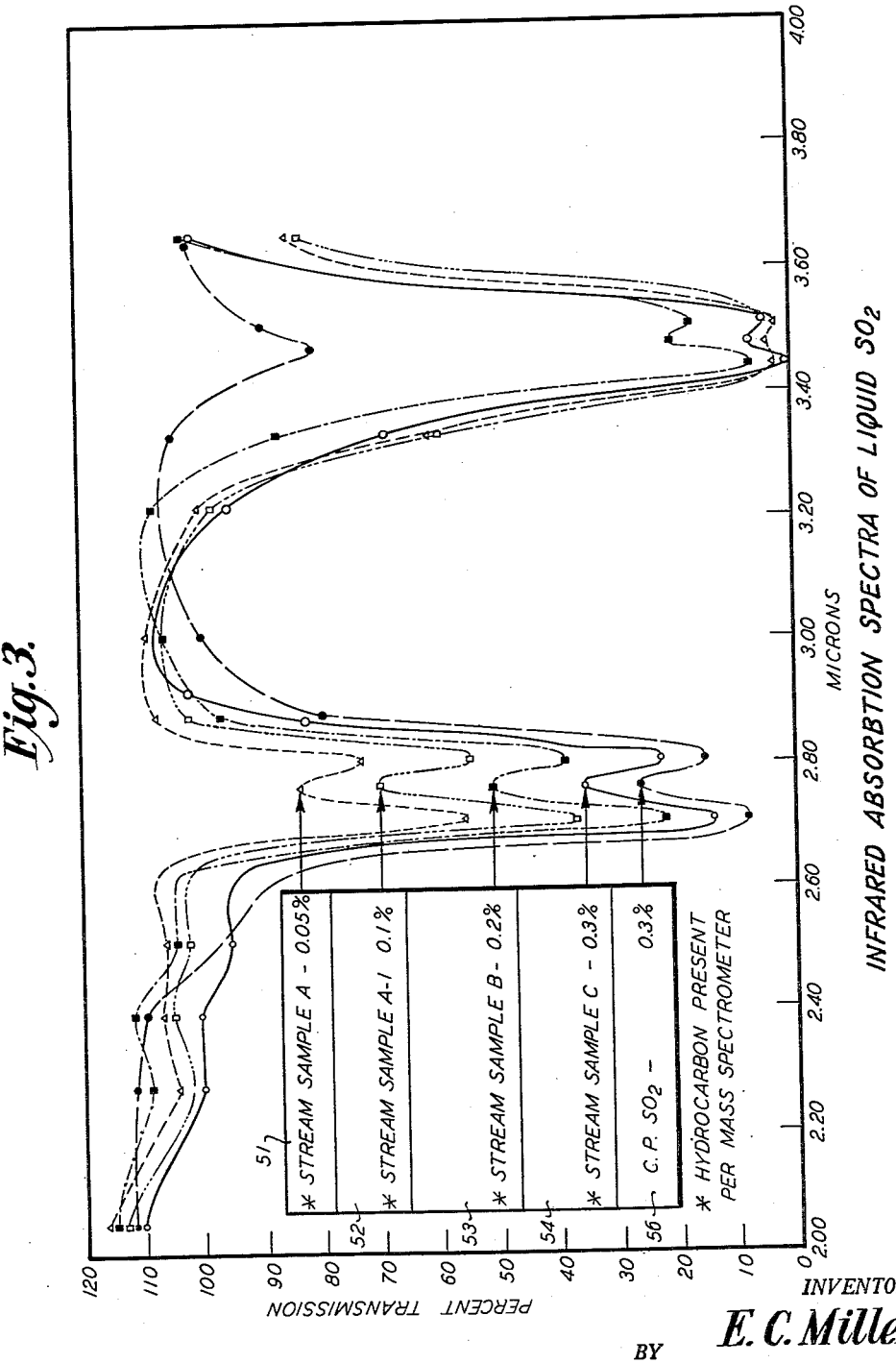

United States Patent Office 2,810,835
Patented Oct. 22, 1957

2,810,835

COMPOSITION ANALYZER UTILIZING RADIATION

Elmer C. Miller, Bartlesville, Okla., assignor to Phillips Petroleum Company, a corporation of Delaware Application October 5, 1953, Serial No. 384,093

11 Claims. (Cl. 250—43.5)

This invention relates to analyzers of the type wherein a sample of fluid to be analyzed is placed between a radiation source and a plurality of radiation detectors.

The use of instruments, such as infra-red analyzers, differential refractometers, and the like, is becoming increasingly important in the analysis of process streams in chemical and other industries, and in process control. In such instruments, a beam of radiation is focused upon a plurality of radiation detectors, a sample of the fluid to be analyzed being passed through a sample cell interposed in the path of one or more beams. Various types of filters can be provided where both beams pass through a single sample cell in order to render one beam insensitive to changes in the component to be determined while the other beam is sensitized to such changes. In this manner, the differential reading of the two detectors provides a measure of the concentration of the component while changes in source intensity, in accuracies induced by drift or aging of circuit components, and the like, are balanced out. However, difficulties are still encountered in balancing out all factors affecting the reading except the concentration of the desired component, particularly where the stream to be analyzed is a fluid under high pressure.

It is an object of this invention to provide an improved analyzer wherein changes resulting from factors other than changes in composition of the test component are effectively balanced out.

It is a further object to provide an analyzer system capable of handling fluid streams, particularly liquid streams, under high pressures.

It is a further object to provide an analyzer which is simple in construction and operation, and which requires a minimum of mechanical, electrical, and optical parts.

Various other objects, advantages, and features of the invention will become apparent from the following detailed description taken in conjunction with the accompanying drawings, in which:

Figure 1 is a schematic diagram of the analyzer of this invention with the sample cell shown in vertical section;

Figure 2 is a detail view of a part of the sample cell; and

Figure 3 is a graph illustrating absorption spectra of liquid sulfur dioxide streams containing water and hydrocarbons.

Referring now to the drawings in detail and particularly to Figures 1 and 2, radiation from a source 10 is reflected by focusing means including a pair 11, 12 of spherical front surface, concave mirrors. These mirrors provide two radiation beams which pass through a sample cell 13 and a filtering unit 14 to a pair of detector devices 15 and 16.

Where infra-red radiation is utilized, source 10 is preferably an elongated filament arranged in the form of a coil, as indicated by reference numeral 10a, and the detectors 15, 16 are bolometers which form a part of a suitable recording mechanism, such as that described in U. S. Patent 2,579,825. The output of the recording mechanism is representative of the difference in resistance between the two bolometers, and can be used for process control or, alternatively, it can be fed to any suitable type of indicating or recording mechanism.

The construction of cell 13 is such as to readily withstand high pressures. As will become evident hereinafter, it has a very narrow width and, due to the optical arrangement of the system, a diameter smaller than has hitherto been obtainable with a double beam instrument. To this end, the cell is formed from two spaced annular end plates 16, 17 which are secured together in any suitable manner, for example by bolts 18. Formed in the facing surfaces of the plates 16, 17 are cylindrical recesses within which are fitted an annular gasket 19, a quartz window 20, an annular gasket 21, a quartz window 22, and an annular gasket 23. Gaskets 19, 21, and 23 are preferably formed from a soft flowable metal, such as lead, so that the pressure exerted upon them by tightening of the bolts 18 compresses the metal and forms a gas tight seal. Gasket 21 has a pair of diametrically opposite recesses or cutout portions 21a, 21b, Figure 2. Cutout portion 21a communicates with a bore 26 which extends through window 20, gasket 19, and end plate 16 to a connection for a sample inlet line 27. Recess 21b communicates with a bore 28 which extends through window 22, gasket 23, and end plate 17 to a suitable fitting for an outlet line 29. In this manner, a sample to be analyzed can be fed through line 27, whence it passes through the cell 21c defined by the gasket 21 and out through bore 28 and line 29. Although the flow of sample is usually continuous, a stationary sample can be trapped within the cell, if desired.

By this construction, the thickness of the cell can be about one millimeter or less, thereby to provide improved absorption characteristics, thus permitting the apparatus to be used with samples having strong absorption characteristics, particularly liquid samples. This narrow cell width is also effective in reducing the volume of the sample contained within the apparatus so that the sample present in any given moment can be quickly swept away and replaced by a new sample entering through line 29. As a result, the analyzer of this invention is more quickly responsive to changes in stream composition than analyzers having a larger sample cell. Further, as will become evident hereinafter, the diameter of the cell can be reduced to one inch or less, the resulting decrease in cell volume contributing to the advantages just noted.

In accordance with the invention, the cell diameter is substantially reduced by passing both beams of radiation through a common part of the sample cell. This is effected by making the beams cross or intersect as they pass from the source to the detector units. Referring again to the drawing, it will be noted that the path of one beam from source 10 to mirror 11 is defined by lines 30, 31, and the path of the reflected beam from mirror 11 is denoted by lines 32, 33, this beam converging as it is reflected upon the detector 16 by the mirror so as to cast an image of the source upon the detector. Bearing in mind that the source is, as shown, an elongated filament and that the mirror 11 is a spherical mirror, it will be evident that the path of the beam passing from mirror 11 to the detector 16 is of generally frusto-conical configuration. In similar fashion, a radiation beam bounded by lines 34, 35 passes from source 10 to mirror 12, and a beam defined by lines 36, 37 of generally frusto-conical configuration passes from mirror 12 to detector 15.

The mirrors 11, 12 are so arranged with respect to the source 10 and detectors 15, 16 that they cross or intersect along a substantial zone. With the arrangement shown in Figure 1, the zone of intersection is a double conical surface having one apex at 37a and its other apex at 38, the two sections of the cone having a common base of generally circular cross section defined by a plane perpendicular to the beam axes and passing through points 39 and 40. At this plane, the two radiation beams are substantially coincident and, in accordance with the invention, this plane is disposed within and preferably at the middle of cell 21c between the quartz windows 20 and 22.

This optical arrangement has important advantages in that the sample cell need not be large enough to permit separate passage of the two radiation beams. Rather, it need only be large enough to permit passage of a single beam as the two beams described herein are substantially coincident at the path where they pass through the cell. The aforementioned narrowness of the cell permits this plane of coincidence to encompass substantially the entire cell width. Hence, cell diameters of the order of magnitude of one inch are readily obtainable by using the optical system of my invention, as compared with a diameter or major dimension of two or three inches with cells heretofore utilized. A further important advantage of the described intersection of the radiation beams is that essentially identical paths are provided through the cell for both beams, thereby minimizing the effects of any change in the transmission characteristics of the cell. For example, a speck of foreign material which may happen to pass through the cell will affect both beams equally, and will not be reflected in the recorder output, as this output is responsive only to the difference in resistance of the bolometers produced by different magnitudes of the radiation beams impinging upon the bolometers.

It will be evident from the foregoing discussion that the maximum advantages of my invention are obtainable where the beams are substantially coincident at the region where they pass through the cell, as is the case in the illustrated modification. However, as long as the cell is located at least partially within the zone of intersection of the beams, i. e., in the region determined by the double cone having its respective apices at 37a and 38, substantial advantages will result in reduction of cell size and improved transmission characteristics for the radiation beams.

Although the advantages of the invention are generally applicable to double beam analyzers utilizing a single sample cell, whether ulta-violet, infra-red, visible, or other radiation is used, the system has particular applicability to the infra-red analysis of streams containing sulfur dioxide, water, and hydrocarbon materials.

This can best be explained by referring to Figure 3 of the drawing, which illustrates the infra-red spectra of liquid sulfur dioxide containing varying amounts of water and hydrocarbons in small concentrations. Curves 51, 52, 53, and 54 represent spectra when the water content of the sulfur dioxide is 0.05, 0.1, 0.2, and 0.3 mol percent, respectively. Curve 56 represents the spectrum of liquid sulfur dioxide containing 0.3 mol percent water, but free of any hydrocarbons. The spectra illustrated by curves 51, 52, 53, and 54 indicate that the water and hydrocarbons occupy distinct and separate absorption bands at approximately 2.70–2.80 microns and 3.40–3.60 microns, respectively. That the absorption band at 3.40–3.60 microns is due to hydrocarbons is substantiated by curve 56 which illustrates the spectrum of chemically pure liquid sulfur dioxide containing 0.3 mol percent water. This spectrum does not have the 3.40–3.60 micron absorption band as do the spectra of sulfur dioxide which contains hydrocarbons. That the absorption bands at 2.70–2.80 microns are due to water is shown by their changes in intensity with variations in water content. It is thus apparent that the water bands are well separated from interfering bands and that by measuring the energy absorption in the 2.70–2.80 micron region of a sample of liquid sulfur dioxide containing water, it is possible to determine the water content of the sample.

In making this determination, an infra-red analyzer previously described can be advantageously used.

Referring again to Figure 1 of the drawing, in analysis of sulfur dioxide containing streams, the sulfur dioxide stream whose water content is to be determined is passed continuously through sample cell 21c. The transparent windows of the cells should each be about 4 or more millimeters thick, i. e., sufficient to withstand the pressures involved, and, assuming that quartz is being used, they will exclude radiation above about 4.5 microns. A filter cell 58 forming a part of filter unit 14 in reference beam 36, 37 is filled with a material which will absorb radiation having a wave length longer than about 2.5 microns so as to sensitize beam 32, 33 to the 2.70 to 2.80 micron water absorption band. Liquid sulfur dioxide containing a known amount of water depending upon the desired sensitivity of the analysis can be used in the cell 58 in sufficient thickness and concentration to block out the 2.70 to 2.80 micron region. A cell 59 is allowed to remain empty, i. e., contain air, and has no effect on the beams 32, 33 passing therethrough. In this arrangement, no interference cell is required because both beams would be equally sensitive to hydrocarbons present in the sample cell. However, where filter 58 is of Vycor, i. e., of borosilicate glass containing about 96% combined silica, the beams are not equally sensitive to hydrocarbons, and an interference filter is required to desensitize both beams to hydrocarbons. To this end, an interference cell 60 is filled with a material which will absorb from both beams radiation having wave lengths longer than about 3.2 microns so as to desensitize the analyzer to variations in the hydrocarbon content of the sulfur dioxide stream. A hydrocarbon gas, which will absorb radiation at about 3.40 to 3.60, can be used in cell 60. It is to be understood that any type of sensitizing or interference filter can be utilized with the analyzer as long as the filter absorbs infra-red radiation in the wave length regions as indicated. Thus, solid filters can be used to replace the gaseous and liquid materials as described above, in which case an interference filter 60 of polyethylene can be used.

The beams, in passing through sample cell 21c, both lose a certain amount of energy by absorption in the 2.70–2.80 micron region because of the presence of water in the sulfur dioxide stream. The amount of energy actually lost will depend on the percent of water contained in the sample stream. Beam 36, 37 in passing through filter cell 58 loses substantially all its energy at wave lengths of about 2.70–2.80 microns.

The beams after passage through the cells, as indicated, contain different total energies, such difference representing the radiation in the 2.70–2.80 micron region which was not absorbed when beams 32, 33 passed through sample cell 27. The beams of radiation on being detected by bolometers 15 and 16 produce temperature changes therein which, in turn, vary the electrical resistances of the bolometers. With the arrangement of apparatus as described, the differential in resistance between the bolometers indicates the amount or percentage of the water contained in the liquid sulfur dioxide sample. The bolometers may be connected in a circuit similar to that described in U. S. Patent 2,579,825, in which event a continuous record of the water content of the sample is provided.

While this invention has been described with a certain degree of particularity, it is within the contemplation of the invention to utilize any suitable filter arrangements. For example, the analyzer may be set up so that one bolometer has a filter to exclude radiation longer than 3.2 microns while the other bolometer has a filter to exclude radiation longer than 2.5 microns with the sample being in both beams. The analyzer may also be set up so that the sample is in one beam, and a hydrocarbon filter is in both beams. Various other modifications of the invention will occur to those skilled in the art upon reading of the foregoing disclosure. It will be evident that the transparent windows of the cell which, in a preferred embodiment, are formed from quartz need not necessarily be transparent to radiation of every frequency. Rather, when I speak of transparent windows in the appended claims, I denote that they are transparent to those radiations having a frequency such that they are useful in making the desired stream analysis.

I have also found that filter 60 can be eliminated, in some cases, without elimination of its function, by utilizing a quartz filter at 59, and a special quartz filter at 58, referred to herein as a Hanovia ultrasil filter, this filter having a sharp absorption band at wave lengths of between 2.6 and 2.9 microns, and having similar absorption properties to quartz beyond 3.5 microns. With this combination, at wavelengths longer than 3.0 microns, the beams are equally sensitive to changes in hydrocarbon concentration, even though an interference filter 60 is not included.

I claim:

1. An analyzer comprising, in combination, a radiation source, a pair of radiation detectors, means focusing a first beam of radiation from said source on one of said detectors, means focusing a second beam of radiation from said source on the other detector, said focusing means being constructed and arranged so that there is a zone of intersection of said beams, and a sample cell having a pair of spaced windows transparent to said radiation, the region between said windows being located within said zone of intersection.

2. An analyzer comprising, in combination, a radiation source, a pair of radiation detectors, means focusing a first beam of radiation from said source on one of said detectors, said beam having a generally frusto-conical cross section throughout a substantial portion of its length, means focusing a second beam of radiation from said source on the other detector, said second beam having a generally frusto-conical cross section throughout a substantial portion of its length, said focusing means being constructed and arranged so that there is a zone of intersection of the frusto-conical portions of said beams, and a sample cell having a pair of spaced windows transparent to said radiation, the region between said windows being located within said zone of intersection.

3. An analyzer comprising, in combination, a radiation source, a pair of closely spaced radiation detectors, means including a pair of closely spaced spherical mirrors arranged to focus beams of radiation from said source upon the respective detectors, said mirrors being arranged in such manner that there is a zone of intersection of said beams including a region where the cross-sections of the beams normal to their axes are substantially coincident, and a sample cell having a pair of spaced windows transparent to said radiation, said region being located between said windows.

4. An analyzer comprising, in combination, an elongated filament defining a radiation source, a pair of closely spaced detectors, focusing means including a pair of spherical mirrors arranged to focus images of said source upon the respective radiation detectors, said mirrors being arranged so that the resulting radiation beams have coincident portions over a substantial path length, and a sample cell having a pair of spaced windows located in the path of said beams and transparent to said radiation, the region between said windows being located within a coincident portion of said radiation beams.

5. An analyzer comprising, in combination, an elongated filament defining a radiation source, a pair of closely spaced radiation detectors, focusing means including a pair of spherical mirrors arranged to focus images of said source upon the respective radiation detectors, said spherical mirrors being arranged to produce radiation beams of generally frusto-conical configuration, there being a region of intersection between said beams where they are substantially coincident, and a sample cell having a pair of spaced windows located in the path of said beams, said region of intersection being located between said windows.

6. An analyzer comprising, in combination, a source of infra-red radiation, a pair of bolometers, means for focusing beams of radiation from said source upon the respective bolometers, said focusing means being constructed and arranged so that there is a zone of intersection of said beams, and a sample cell having a pair of spaced windows transparent to infra-red radiation over a preselected frequency range, the region between said windows being located within said zone of intersection.

7. An analyzer comprising, in combination, a source of infra-red radiation, a pair of bolometers, means for focusing beams of radiation from said source upon the respective bolometers, said focusing means being constructed and arranged so that there is a zone of intersection of said beams, and a sample cell having a pair of spaced quartz windows, the region between said windows being located within said zone of intersection, and filtering means in both beams located outside said zone of intersection, said filtering means including a filter of borosilicate glass containing about 96% combined silicate in one beam and filters of solid hydrocarbon material of equal thickness in both beams.

8. An analyzer in accordance with claim 7 in which the solid hydrocarbon material is polyethylene.

9. An analyzer comprising, in combination, a source of infra-red radiation, a pair of bolometers, means for focusing beams of radiation from said source upon the respective bolometers, said focusing means being constructed and arranged so that there is a zone of intersection of said beams, and a sample cell having a pair of spaced quartz windows, the region between said windows being located within said zone of intersection, means for passing a sample containing water and sulfur dioxide between said windows, filtering means in both beams located outside said zone of intersection, said filtering means including a filter of borosilicate glass containing about 96% combined silica in one beam and a filter of solid hydrocarbon material of equal thickness in both beams, and means for measuring the relative resistance of said bolometers.

10. An analyzer comprising, in combination, an elongated filament defining a source of infra-red radiation, a pair of closely spaced bolometers, focusing means including a pair of spherical mirrors arranged to focus images of said source upon the respective bolometers, said spherical mirrors being arranged to produce radiation beams of generally frusto-conical configuration, there being a region of intersection between said beams where they are substantially coincident, a sample cell having a pair of spaced quartz windows located in the path of said beams, said region of intersection being located between said windows, means for passing a sample containing water and sulfur dioxide between said windows, filtering means located outside said region of intersection and including a filter of borosilicate glass containing about 96% combined silica in one beam together with a polyethylene filter in both beams, and means for measuring the relative resistance of said bolometers.

11. An analyzer comprising, in combination, a radiation source, a pair of radiation detectors, means focusing a first beam of radiation from said source on one of said detectors, said beam having a generally frusto-conical cross section throughout a substantial portion of its length, means focusing a second beam of radiation from said source on the other detector, said second beam having a generally frusto-conical cross section throughout a substantial portion of its length, said focusing means being constructed and arranged so that there is a zone of intersection of the frusto-conical portions of said beams, and a cylindrical sample cell having its longitudinal axis substantially coincident with the axes of said beams within said zone of intersection, said cell having end windows transparent to said radiation, the spacing between said windows being less than one millimeter.

References Cited in the file of this patent

UNITED STATES PATENTS

| | | |
|---|---|---|
| 2,212,211 | Pfund | Aug. 20, 1940 |
| 2,314,800 | Pineo | Mar. 23, 1943 |
| 2,579,825 | Hutchins | Dec. 25, 1951 |
| 2,604,810 | Backhouse | July 29, 1952 |
| 2,617,940 | Giguere | Nov. 11, 1952 |